Feb. 22, 1966 D. N. YATES 3,235,987
CREATION OF MOTION EFFECTS FROM STILL ARTWORK
Filed Aug. 13, 1965 3 Sheets-Sheet 1
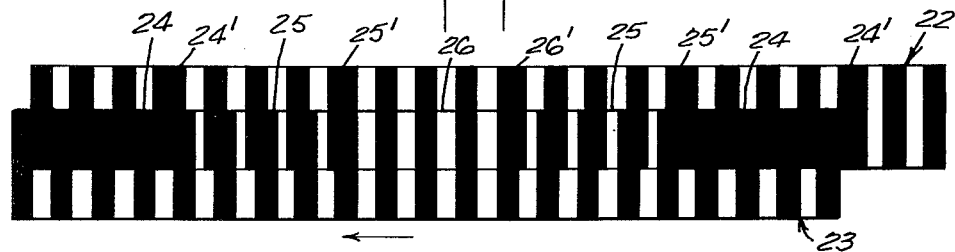
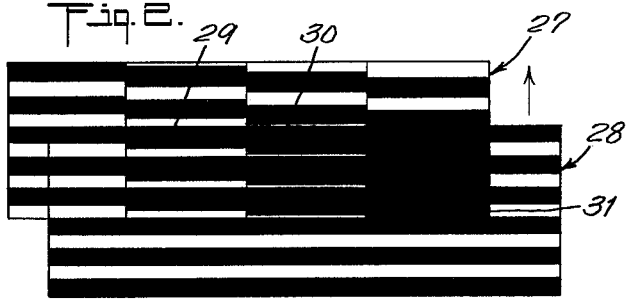
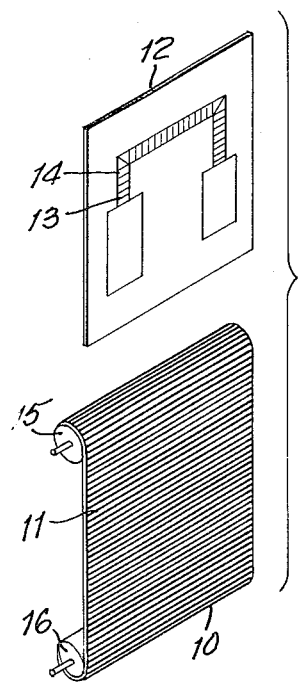
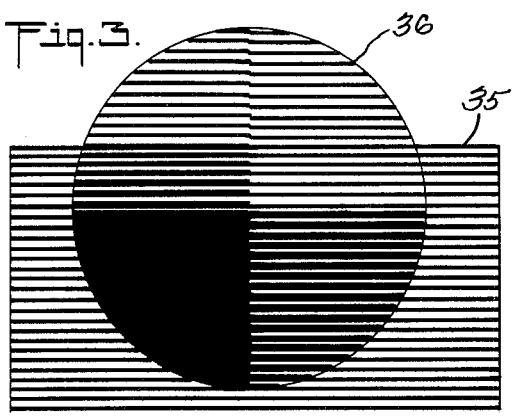
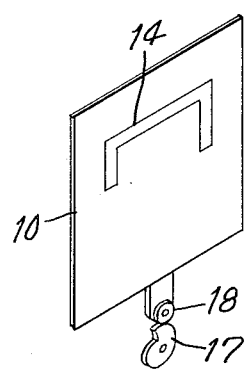
INVENTOR.
DONALD N. YATES
BY
ATTORNEY

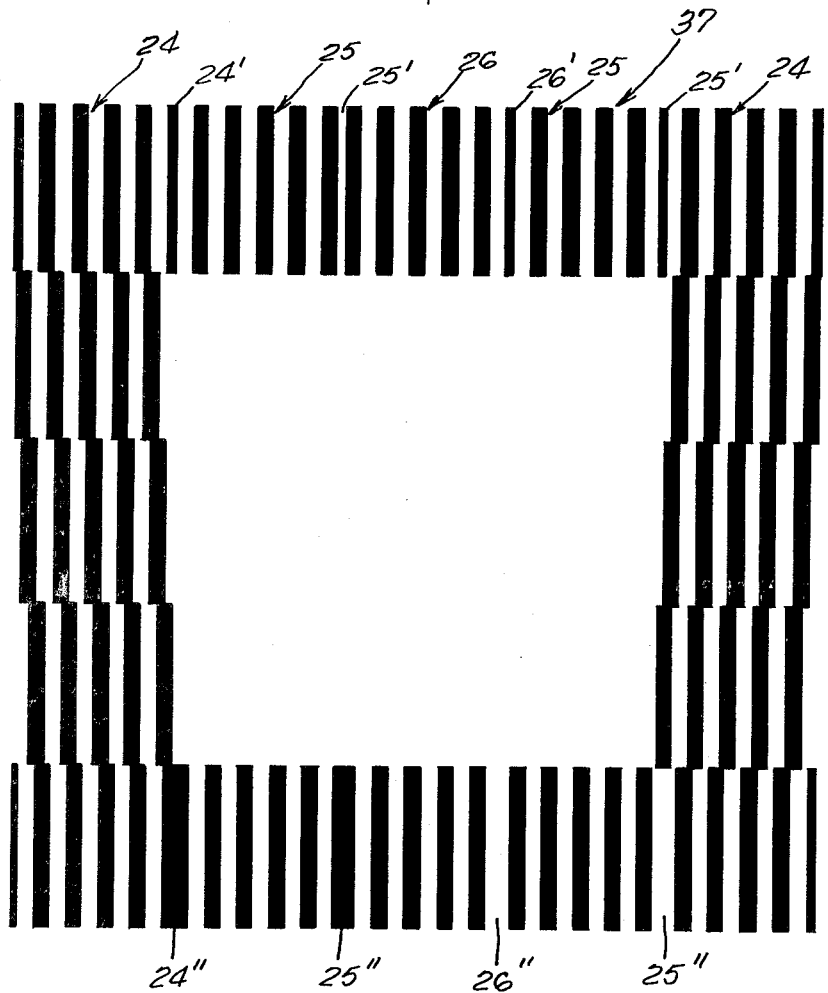

Feb. 22, 1966   D. N. YATES   3,235,987
CREATION OF MOTION EFFECTS FROM STILL ARTWORK
Filed Aug. 13, 1965   3 Sheets-Sheet 3

INVENTOR.
DONALD N. YATES
BY
ATTORNEY

United States Patent Office

3,235,987
Patented Feb. 22, 1966

3,235,987
CREATION OF MOTION EFFECTS FROM
STILL ARTWORK
Donald N. Yates, 710 Rockwood Drive, Gibsonia, Pa.
Filed Aug. 13, 1965, Ser. No. 479,451
17 Claims. (Cl. 40—106.51)

The invention herein disclosed relates to the creation of the effects and appearance of objects and materials in motion, while using stationary or so-called "still" artwork.

This is a continuation-in-part of copending patent application Ser. No. 179,411, filed March 13, 1962.

Special objects of the invention have been to accomplish motion effects without resorting to rotary light polarization.

Accordingly within the scope of the present invention the appearance of motion is produced from stationary artwork by a system of relatively shiftable grids made up of lines or bars of light obstructing elements to create the effect of rapidly moving, shifting shadows and in which an artwork transparency is associated with one of the relatively movable grids.

Normally, in such a combination, one grid may be in the form of a stationary screen carrying the artwork and the other grid may be shiftable in respect to such first transparency and may have means for shifting it in the proper sense to create the desired impression of movement.

Other novel features of the invention and desirable objects attained are set forth and will appear in the course of the following specification.

The drawings accompanying and forming part of the specification are illustrative of certain practical embodiments of the invention but structure may be modified and changed as regards the immediate illustration, all within the true intent and scope of the invention as hereinafter defined and claimed.

FIG. 1 in the drawings is a diagrammatic view illustrating one form of grid combination consisting of vertical lines in slightly offset relation, creating horizontal travel of shaded and blocked out areas with relative horizontal shifting movement of the two screens.

FIG. 2 is a similar view of horizontally lined screens of different pitch creating horizontal travel with relative vertical movement of the screens.

FIG. 3 is a diagrammatic view showing companion screens for producing revolving motion.

FIG. 4 is a perspective view showing one screen as the stationary element, carrying the artwork which is to present the effect of movement and which is overlaid by an offset lined screen supported on traveling rollers.

FIG. 5 is a perspective view illustrating a modification in which the movable screen is actuated by cam mechanism.

FIG. 6 is a diagrammatic view of another form of artwork grid for producing motion effects in a clockwise or counterclockwise direction.

Figure 7:
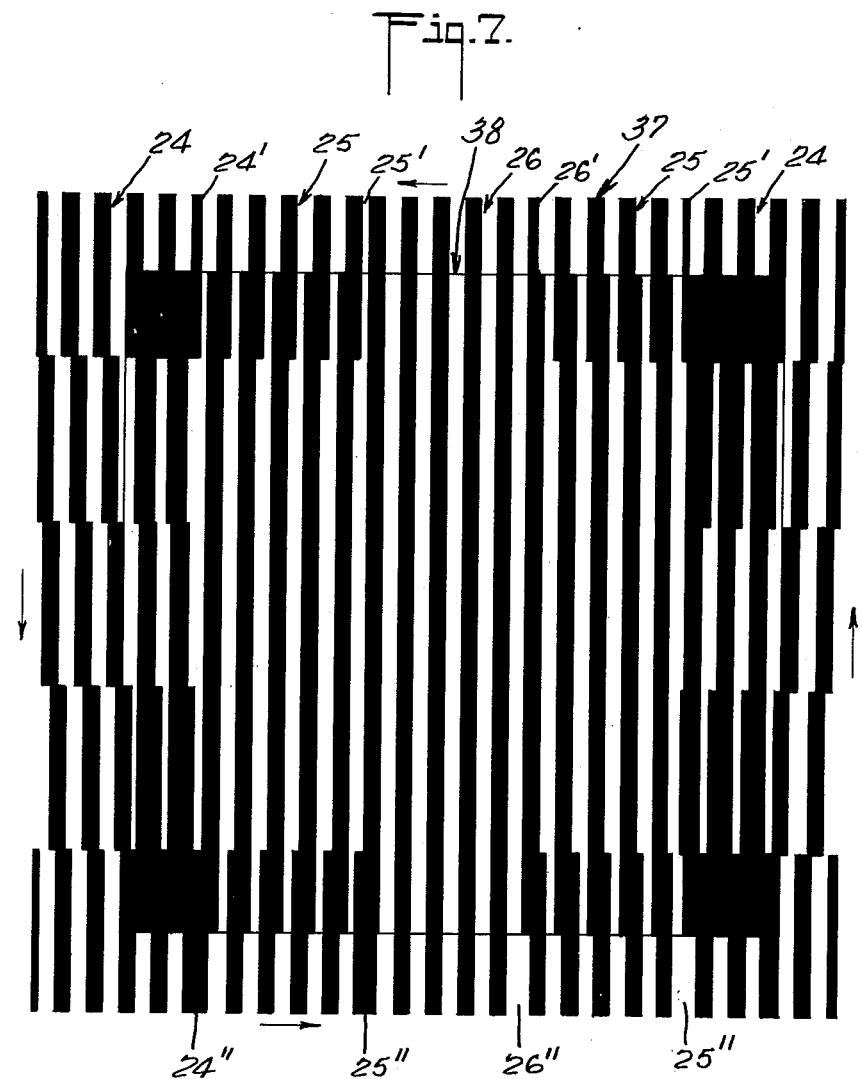
FIG. 7 is a diagrammatic view showing the control grid combined therewith.

FIGS. 4 and 5 show how the effects of motion are created by shifting an obscurating screen 10, lined to one effect at 11, over the face of a relatively stationary screen 12, lined to slightly offset effect at 13 and carrying artwork 14 which is to present or contain the desired animation or motion effects.

In FIG. 4 the movement of the traveling screen is shown as accomplished by mounting it on supporting rollers 15, 16, one or both of which may be driven at the right speed to cause travel of the shifting shadows at the desired rate of travel.

The shadow movement is much more rapid than the screen movement so that the screen may be shifted to a slight extent and quite slowly to produce a magnified and much faster movement of the shadow creating effects.

As one possible variation the shiftable screen may be guided for vertical movement and be slowly shifted up and down by a cam 17. FIG. 5, engaging a roller 18 connected with the shiftable screen.

In FIG. 1, vertically lined screens 22, 23, are shown, made up of vertical lines and spaces which with horizontal movement of one in respect to the other will create lateral travel of solid black partially shaded and clear areas 24, 25, 26, etc.

Definite ordered movement in one direction is attained by setting up the lines and spaces on one screen, the stationary screen 22, in FIG. 1, in groups with the parallel lines and spaces in each group of the same equal width as shown at 24, 25, 26, 25, but with these groups separated at 24', 25', 26', 25', by spaces which are different, in this illustration, slightly wider than the spaces between the lines of that grid, combined with a movable grid, 23, in the illustration, having lines and spaces all of equal width and all of the same width and spacing as the lines in the several groups of the first grid.

FIG. 2 illustrates screens 27, 28, lined horizontally, with the lines and spaces of the first grid arranged in adjoining blocks or groups; each group made up of parallel lines and spaces of equal width, with each group shifted slightly in a direction perpendicular to the lines and spaces, combined with a vertically shiftable grid made up of parallel lines and spaces, all of equal width and of the same width as the lines and spaces in each group of the first grid.

FIG. 3 illustrates one way in which grids like those shown in FIGS. 1 and 2 may be combined to create the effects of rotary motion.

In this case, the vertically movable grid 35 has parallel horizontal lines and spaces all of equal width and this grid is shifted over the artwork grid 36 having lines and spaces in groups in the same spacing as the lines in the movable grid, but in the form of segments of a circle offset and shifted in respect to adjoining groups.

Thus the two segments at the top in adjoining end to end relation are slightly offset vertically as in FIG. 2; the adjoining segments at the bottom are offset vertically but in the opposite direction so as to create the effect of travel in opposite directions at the top and bottom of the figure; while adjoining blocks at the left and at the right are separated by spaces slightly different from the spacing of the lines with wider spacing at one side and narrower spacing at the opposite side to create the effects of vertical movement in opposite directions.

Relative vertical movement with lines in parallel relation will thereby create the appearance of rotary motion, with travel up at one side, across the top in one direction, down the other side and across the bottom in reverse direction from the top, creating the desired rotary effect.

The shapes of the grids may vary in accordance with the outlines of the artwork which is to be animated.

The arrangement shown in FIG. 1, with an equal number of lines in each group of the artwork grid will produce a smooth continuous flow of action such as the continuous flow of material through a pipe line represented on the artwork grid.

The circular segmented form of artwork grid shown at 36, FIG. 3, will produce rotary motion, direction controlled by direction of movement of the parallel lined linear grid 35.

The number of lines in each segment forming group is the same, so that the rotary movement effect will be regular or constant.

If, on the other hand, the number of lines in different groups is different, the action will be irregular or faster or slower, producing different unusual effects.

By changing the spacing between the different groups of lines at the animation grid, reverse motion effects may be obtained with movement of the control grid in the same direction. For example, a representation of circular objects being made to appear rotating in opposite directions with movement of the control grid in just the one direction.

These various factors may be utilized to produce definitely planned results.

The grids or screens may be made up of appropriately lined films, with one film carrying the artwork and the other movable over the face of the first.

Many types, directions of movement, speed of action and various special effects can be created.

The artwork may be directly on the stationary screen or be a separable transparency applied over that screen.

The ratio of apparent travel to actual movement of the grid may be controlled by speed of such movement or by varying the differential between the groups of lines or markings of the two screens.

The grid system illustrated in FIG. 1 may be used to produce many types of motion, from simple linear action to rotating, pulsating, radiating and other special effects. As the movable grid shifts to the left the motion of the dark sections will be rapidly to the left.

The width of the grid lines and of the spaces between control the direction and speed of motion.

In FIG. 2, as the movable grid shifts upwardly the blocked out dark sections appear to be moving toward the left, creating apparent motion.

In the form of the invention shown in FIG. 5, the movable element may be a clear plate with an area of a grid pattern as shown to operate over the stationary animated plate. As the cam in this case rotates the front plate is slowly moved up, creating the appearance of motion in the stationary animated plate. As the movable plate reaches top position with the cam constantly turning, the roller drops to low position and then slowly starts raising the plate, creating the desired animation. This return action may be so quick as to ordinarily not be observable by the eye so that appearance of constant motion may be effected.

The animated art may be a piece of printed artwork with the grid system printed on the face and the moving grid be on a transparent piece of film operating over the artwork.

Normal outside lighting is all that is required to see the animated picture but back or front lighting may be provided or the invention be used in an optical projector system for projecting an enlarged version of the movement on a viewing screen.

The shifting shadows created by the vernier relation of the illustrative artwork screen and movable obscurating screen may be utilized to illustrate many kinds of motion, such as flow in transmission lines and the like and this is accomplished by a simple mechanical combination.

In a construction using a cam drive, such as shown in FIG. 5, the cam may be given a shape to produce changes in speed, direction of movement and other variations of the created motion depicting effects.

While film may be generally preferred for the grid material, other suitable translucent or transparent materials may be employed for this purpose.

These companion transparent grids with their offset solid portions are in effect lined to produce alternate clearance and degrees of varying or complete obscuration upon relative movement or sole movement of one over the other.

The artwork may consist of any desired illustrative matter and be in color or in simple black and white.

The artwork grid 37, illustrated in FIG. 6, when combined with a control grid 38, of equally spaced parallel lines with the control grid being moved slowly to the right, will produce the counter clockwise outline movement indicated in FIG. 7.

This is accomplished by arranging the groups of parallel lines in the form of a square and by spacing the groups 24, 25, 26, across the top with narrower spaces 24', 25', 26', between adjoining groups; by separating the groups across the bottom by wider spaces 24", 25", 26", so that the motion effects across the top and bottom will be in opposite directions; and by arranging the groups forming the sides of the figure in reversely slanted offset end-to-end relation so as to create upward motion at one side and downward motion at the other side as indicated by the arrows in FIG. 7.

The required relative movement of the grids may be effected mechanically, as indicated, or by hand or otherwise.

What is claimed is:

1. Apparatus for creating definite motion effects from still artwork comprising in combination
    a stationary grid with overlying artwork and consisting of spaced groups of parallel lines and spaces, each group composed of parallel lines and spaces of equal width,
    said groups of lines and spaces being in parallel relation and the
    said groups being spaced from each other a distance slightly different from the spacing of the lines and spaces in the groups and
    a movable grid overlying said stationary grid and composed of parallel lines and spaces all of equal width and of the same width and spacing as those of the first mentioned grid,
    said movable grid being mounted with the lines and spaces of the same parallel with the lines and spaces of the first mentioned grid and
    means for effecting transition of said movable grid in a direction with the lines and spaces of the same at all times in perpendicular relation with the lines and spaces of the first mentioned grid.

2. The invention according to claim 1, in which there are the same number of lines and spaces in each of said groups of lines and spaces.

3. Apparatus for creating definite motion effects from still artwork comprising in combination
    a stationary grid carrying artwork to be animated and made up of
    parallel lines and spaces of equal width arranged in
    successively disposed groups of equally spaced lines and spaces with
    adjoining groups separated by spaces of different width from the lines and spaces in said groups,
    the other grid being made up of equally spaced lines and spaces, equal in spacing to the lines and spaces in said groups and
    means for shifting said second grid perpendicularly to the lines of said grids and at all times with the lines in the two grids in parallel relation.

4. Apparatus for creating definite motion effects from still artwork comprising in combination
    relatively shiftable grids in overlying relation,
    one of said grids having groups of spaced parallel lines with the groups arranged in adjoining position and adjoining groups separated by spaces different from the spacing of the lines forming each group and
    said other grid having parallel lines spaced the same as the spacing of the lines in the groups of the first grid and
    means for relatively shifting said grids with the lines of the same at all times in parallel relation.

5. Apparatus for creating the effect of motion in a continuous circuit and comprising an artwork grid made up of a quadrangular arrangement of parallel lines forming the top and bottom and sides of an open square, the lines across the top and bottom of the square being arranged in groups separated by spaces different from the spaces between the lines and with the separating spaces across the top different from the separating spaces across the bottom of the figure, the lines and spaces forming the sides of the figure being in groups disposed in end-to-end relation and with the adjoining groups of the opposite sides offset laterally in opposite directions and an animating grid of equally spaced parallel lines equal in spacing to the lines of the aforesaid groups and means for relatively shifting the two grids always with the lines of the same in parallel relation.

6. Apparatus for creating the effect of motion comprising an artwork grid made up of groups of parallel lines of equal length and in equally spaced relation, said groups being disposed in adjoining end-to-end relation of the lines forming the groups but with the lines of adjoining groups in slightly offset relation and a grid made up of parallel equally spaced lines, equal in spacing to the spacing of the lines of the artwork grid and means for relatively shifting said grids at an angle to the lines of the same, always with the lines of the two grids in parallel relation.

7. Apparatus for creating the effect of rotary motion comprising the combination of an artwork grid made up of groups of spaced parallel lines, each group in the form of a segment of a circle, said segmental groups in slightly spaced relation and a second grid made up of parallel lines spaced the same as the lines in said segmental groups and means for relatively shifting said grids one over the face of the other.

8. Apparatus for creating the effect of motion comprising an artwork grid made up of groups of parallel lines and in equally spaced relation, said groups being disposed in adjoining end-to-end relation of the lines forming the groups but with the lines of adjoining groups in slightly offset relation and a grid made up of parallel equally spaced lines, equal in spacing to the spacing of the lines of the artwork grid and means for relatively shifting said grids at an angle to the lines of the same, always with the lines of the two grids in parallel relation.

9. The invention according to claim 1 in which said means for effecting transition of the movable grid is in the form of a movable belt.

10. The invention according to claim 1 in which said means for effecting transition of the movable grid is in the form of cam mechanism effecting slow motion in one direction and fast movement in the opposite direction.

11. The invention according to claim 1 with said grids incorporated into an optical projection system.

12. Apparatus for creating definite motion effects from static artwork comprising in combination, a stationary grid with overlying artwork and consisting of spaced groups of parallel lines and spaces, each group composed of parallel lines and spaces of equal width, said groups of lines and spaces being in parallel relation and the said groups being shifted slightly from each other in a perpendicular direction from the said lines and spaces and a movable grid overlying said stationary grid and composed of parallel lines and spaces all of equal width and of the same width and spacing as those of the first mentioned grid, said movable grid being mounted with the lines and spaces of the same parallel with the lines and spaces of the first mentioned grid and means for effecting transition of said movable grid in a direction with the lines and spaces of the same at all times in perpendicular relation with the lines and spaces of the first mentioned grid.

13. Apparatus for creating the appearance of rotary motion, comprising an artwork grid made up of two upper and two lower segments in adjoining relation, each segment composed of parallel lines in equally spaced relation, said segments arranged with the lines of the upper two segments in parallel end-to-end relation, slightly offset in one direction and with the lines of the lower two segments similarly aligned but offset in the opposite direction and with the upper and lower segments at one side spaced a lesser extent and the upper and lower segments at the opposite side spaced a greater extent than the spacing between the lines of said segments, a control grid overlying said artwork grid and made up of parallel lines equal in spacing to the spacing of the lines in said segments, and said grids being relatively movable with the lines of the same in parallelism.

14. Apparatus for creating definite motion effects from static artwork comprising in combination, an artwork grid consisting of spaced groups of parallel lines and spaces, each group composed of parallel lines and spaces of equal width, said groups of lines and spaces being in parallel relation and the said groups being shifted slightly from each other in a perpendicular direction from the said lines and spaces and a movable grid overlying said stationary grid and composed of parallel lines and spaces all of equal width and of the same width and spacing as those of the first mentioned grid, said movable grid being mounted with the lines and spaces of the same parallel with the lines and spaces of the first mentioned grid and means for effecting transition of said movable grid in a direction with the lines and spaces of the same at all times in perpendicular relation with the lines and spaces of the first mentioned grid.

15. The invention according to claim 14 in which said means for effecting transition of the movable grid is in the form of a movable belt.

16. The invention according to claim 14 in which said means for effecting transition of the movable grid is in the form of cam mechanism effecting slow motion in one direction and fast movement in the opposite direction.

17. The invention according to claim 14 with said grids incorporated into an optical projection system.

References Cited by the Examiner

UNITED STATES PATENTS

| 2,058,581 | 10/1936 | Fegan | 40—106.53 |
| 2,246,001 | 6/1941 | Powers | 88—1 X |
| 2,482,947 | 9/1949 | Swarbrick | 40—137 |
| 2,917,854 | 12/1959 | Swarbrick | 40—137 |
| 3,145,250 | 8/1964 | Vargady | 88—1 |

EUGENE R. CAPOZIO, *Primary Examiner.*